Figures 1, 2:
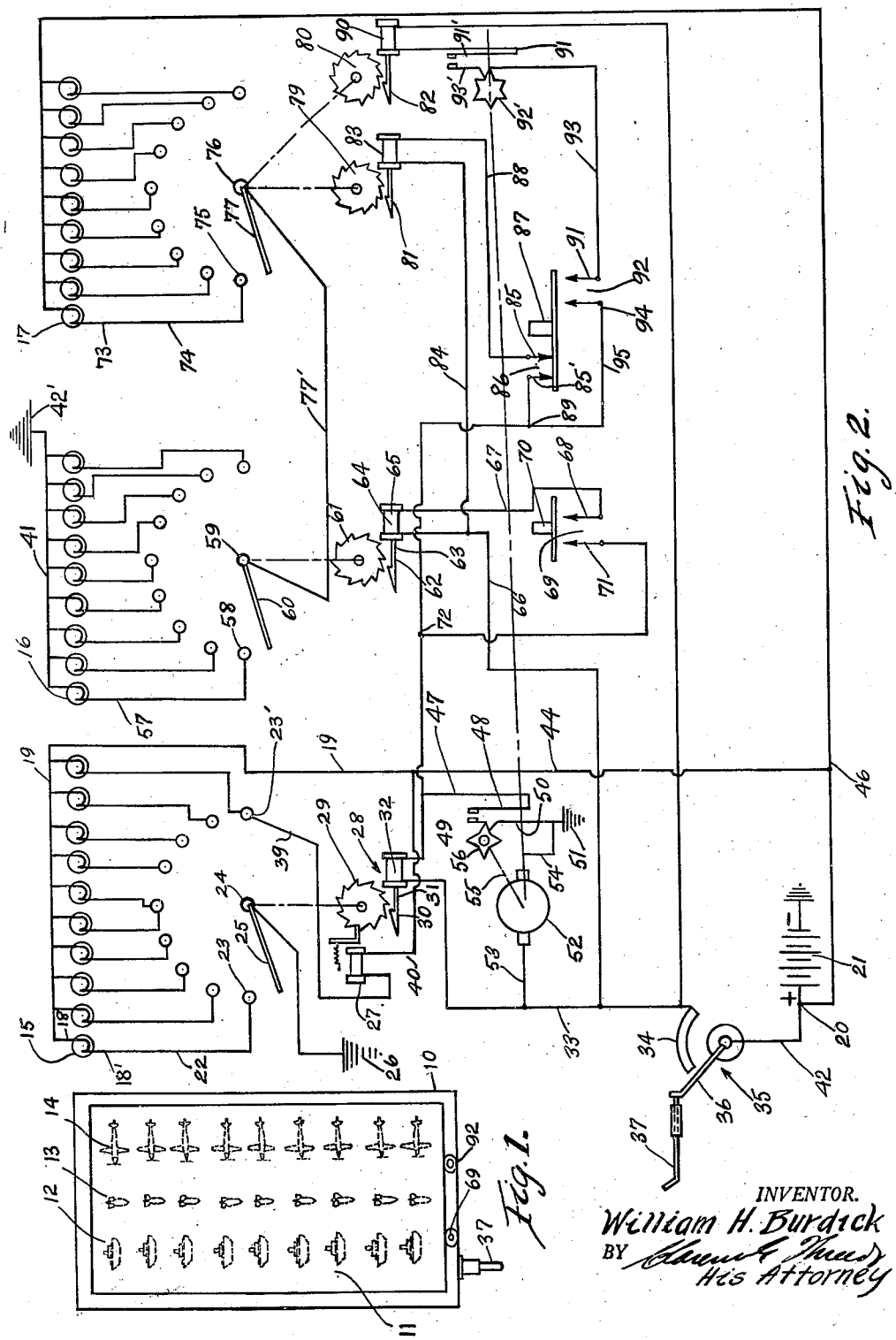

Jan. 11, 1949.  W. H. BURDICK  2,458,892
AMUSEMENT GAME APPARATUS HAVING ILLUMINATING MEANS
SIMULATING DROPPING OF A BOMB FROM AN
AIRPLANE UPON A BOAT
Filed Oct. 26, 1945

INVENTOR.
William H. Burdick
BY
His Attorney

Patented Jan. 11, 1949

2,458,892

UNITED STATES PATENT OFFICE 2,458,892

AMUSEMENT GAME APPARATUS HAVING IL-LUMINATING MEANS SIMULATING DROP-PING OF A BOMB FROM AN AIRPLANE UPON A BOAT

William H. Burdick, Chicago, Ill., assignor, by mesne assignments, of one-half to Vincent T. Connor and one-half to Theodore A. Kruse Application October 26, 1945, Serial No. 624,759

3 Claims. (Cl. 273—1)

This invention relates to certain novel improvements in amusement game apparatuses having illuminating means simulating dropping of a bomb from an airplane upon a boat. It has for its principal object the provision of an apparatus of this character which will be economical in manufacture and amusing when played, both to adults and children.

The invention has for its object the provision of a field board preferably of opaque construction, having printed or otherwise associated therewith, preferably though not necessarily in parallel rows, characters representing different objects, such for example, one row representing ships, the next row representing bombs, and the third row representing planes, the object being to pair one of the lights arranged under each ship with one of the lights arranged under each plane, to represent the dropping of one of the bombs on the ship. These electric lights are arranged beneath the opaque field board and the characters become visible only upon illumination of the lights.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a plan view of a game apparatus having embodied therein the invention; and Fig. 2 is a schematic illustration of one of the preferred forms of electric circuit for carrying my invention into effect.

The drawings show one form of construction by which the several objects of my invention are accomplished.

In this connection, 10 indicates the cabinet of an amusement apparatus. This cabinet may be of any approved construction and includes a panel or field board 11 formed of opaque material and having printed or otherwise associated therewith parallel rows of characters 12, 13 and 14. By virtue of the opaque characteristic of the field board 11, these characters 12, 13 and 14 are invisible until illuminated by electric bulbs, hereinafter referred to, arranged beneath the characters, within the cabinet 10. In the present instance, the characters of the row 12 represent ships; the characters of the row 13 represent bombs; and the characters of the row 14 represent airplanes. The object is to simulate the dropping of a bomb by the plane upon the ship in the event that a light of one of the ships is paired with a light of one of the planes in the same transverse row as the light of the ship.

To accomplish this, there are arranged under each of the ships, bombs, and planes, 12, 13 and 14, respectively, electric bulbs or lights 15, 16 and 17, respectively.

Each of these lights, 15, have their common sides 18 connected to a conductor 19 having connection with the positive side 20 of a source of electric energy 21.

The opposite common sides 18' of the light bulbs 15 are connected by conductors 22 to contact buttons 23 of a suitable step-up switch 24. This step-up switch 24 includes a contact finger 25, and this contact finger 25 is grounded as at 26.

The contact finger 25 is moved step by step into contact with the buttons 23 by a step-up relay 28 of any approved construction including a ratchet gear 29 and a detent or pawl 30 operated by the solenoid 31 of the electromagnetic coil 32. One side of this magnetic coil 32 is connected by a conductor 33 to a conductor plate or bridge 34 of a spring controlled timing switch 35 including a contact arm 36 adapted to be moved into contact with the conductor plate 34. This timing switch is of a well-known construction used in connection with timing the operation of game apparatuses of the character to which this invention relates. The contact arm 36 is adapted to be moved into engagement with the contact plate 34 by actuation of an operating member 37 which, if desired, may be in the form of a coin slide of any approved construction, such as example as that illustrated in Patent No. 1,908,380, dated May 9, 1933.

This contact arm 36 is connected to the positive side of the source of electric energy 21 by a conductor 42.

The other side of the coil 32 of the step-up relay 28 is connected by a conductor 47 to one side 48 of a cam actuated switch unit 49, the other side 50 of this switch unit 49 being grounded as at 51.

A reset relay of any approved construction for resetting the contact arm 25 back to its original position is indicated at 27. One side of the coil of the reset relay 27 is connected by a conductor 39 to the last or ninth contact button, of the buttons 23, said ninth contact button being indicated at 23'. The other side of this coil is connected by a conductor 40 to the conductor 19.

A motor is indicated at 52, and this motor has one side 53 connected to the conductor 33 and the opposite side 54 to the ground 51. On the armature 55 of this motor is a star cam 56 which operates upon the switch unit 49 to make and break the circuit therethrough.

The arrangement thus far is such that by moving the operating member 37 to the right as viewed in Fig. 2, the contact finger 36 will be brought into engagement with the contact plate 34 to open a circuit between the motor 52 and the step-up relay 28, which relay 28 becomes energized when the switch unit 49 is closed by the star cam 56. Each time this relay 28 is energized, the ratchet wheel 29 will be advanced one step and thereby move the contact finger 25 into contact with the buttons 23, and as this contact finger 25 moves into engagement with these contact buttons 23, the circuit between the source of electric energy 21 and the electric bulbs 15 will be completed and will successively illuminate the electric bulbs, and when illuminated they will make visible the ships 12.

The common sides 57 of each of the electric bulbs 16 arranged under the "bomb" characters 13, are connected to contact buttons 58 of a step-up switch 59. This step-up switch 59 is substantially similar to the step-up switch 24 and includes a contact finger 60 operated by a ratchet 61 rotated step by step by a detent 62 carried by a solenoid 63 of an electric step-up relay 64 including an electromagnetic coil 65. One side of this coil 65 is connected by a conductor 66 to the conductor 33. The opposite side of the coil is connected by a conductor 67 to a switch element 68 of a push button switch 69 having a finger button 70. The opposite switch element 71 of this push button switch 69 is connected by a conductor 72 to the conductor 47. This push button switch may be of any approved construction and as shown in Fig. 1, is located upon the cabinet 10 within convenient reach of the player. The object of this push button switch 69 is to complete the circuit to the step-up relay 64 so that the arm 60 will be advanced one step each time the step-up relay 64 is operated, and when the arm 60 successively contacts the contact buttons 58 the electric bulbs 16 will be successively illuminated under conditions hereinafter explained and consequently the "bomb" characters 13 will likewise become successively visible.

The opposite common sides 41 of the bulbs 16 are connected to a ground 42'.

The common sides 73 of the electric bulbs 17 are connected by conductors 74 to contact buttons 75 of a step-up switch 76. The opposite common sides of these bulbs 17 are connected by a conductor 46 to the positive side of the source of electric energy 21.

The step-up switch 76 includes a contact finger 77, which is connected in series with the contact finger 60, by a conductor 77'. This contact finger 77 is controlled by the operation of two step-up relays 79 and 80. Each of these relays includes the ratchet and solenoid operated detent 81 and 82, respectively. The electromagnetic coil 83 of the step-up relay 79 is connected by a conductor 84 to the conductor 66, which in turn, is connected, as before stated, to the conductor 33. The opposite side of the electromagnetic coil 83 is connected through the medium of a conductor 88 to one side 85 of a switch element 86 of a push button operated switch 87. The opposite side 85' of this switch structure 86 is connected by a conductor 89 to the conductor 47. One side of the electromagnetic element 90 of the step-up relay 80 is connected to a contact finger 91 of a cam switch 91', the cam 92' of which is operated by the motor 52 and is of a design whereby to make and break the switch 91' more often in one cycle of rotation than is accomplished by the cam 56 during the same cycle of rotation. The switch structure 92 is part of the structure of the push button switch 87. The other contact finger 93' is connected by a conductor 93 to one side of the switch structure 92, the opposite side 94 being connected by a conductor 95 to the conductor 89.

This push button switch 87, like the push button switch 69, is located upon the cabinet within convenient reach of the operator. The push button switch 87 is of a well-known structure, and in the present instance the switch structure 86 is normally closed to condition the circuit of the electromagnetic element 83, and this circuit is broken when the push button switch 87 is manipulated to condition the switch structure 92 to complete the circuit through the electromagnetic element 90 of the step-up relay 80.

As before stated, the object of the game apparatus is to test the skill of the player in maintaining a vertical row of electric bulbs 15, 16 and 17 illuminated as these bulbs are successively illuminated by the operation of their respective step-up switches 24, 59 and 76.

The game is played as follows:

By manipulation of the operating member 37, the time switch will be operated to bring the contact finger 36 into engagement with the contact plate 34, and until this time switch (which is of a well-known and standard construction) has spent its force, the contact finger 36 will be maintained in engagement with the plate 34. This engagement between the finger 36 and the contact plate 34 sets up the circuit to the motor 52, which when energized will rotate the cams 56 and 92'. Rotation of the cam 56 will open and close the switch structure 49. When this switch structure 49 is closed, the relay coil 32 of the step-up switch 28 becomes energized and rotates the ratchet 29 one step, which brings the contact finger 25 into engagement with the first of the contact buttons 23. When this takes place, the first of the electric bulbs 15 will become illuminated and consequently will make visible the first of the ships 12.

The engagement between the contact finger 36 and the contact plate 34 will also condition the circuit for the step-up relay 64 and in order to complete the circuit to this relay 64, it is necessary that the operator manipulate the push button switch 69 to maintain the switch thereof in closed position, at which time the relay 64 will be energized and will step up the contact finger 60 for engagement with the first of the contact buttons 58 of the step-up switch 59, and this step-up action will continue as long as the push button switch 69 is maintained in closed position.

Engagement between the contact finger 36 and the contact plate 34 likewise conditions the electric circuit for the electromagnetic coils 83 and 90, and as the push button switch structure 86 is normally closed, the electric circuit to the step-up relay 79 will, upon engagement between the contact finger 36 and plate 34, be energized to step up the contact finger 77 for engagement with the contact buttons 75 controlling the illumination of the electric bulbs 17.

As the contact fingers 60 and 77 are connected in series through conductor 77' whenever these fingers engage corresponding contact buttons 58 and 75 the electric bulbs 16 and 17 connected to these buttons will be illuminated provided the player maintains the push button switch 70 closed.

As the object of the game is to have all three lights move down the field board upon the same horizontal line, it may require that the finger 77 advance ahead of the fingers 25 and 60. If this condition prevails, the operator then manipulates the push button switch 87 to break the circuit of the switch structure 86 and to close the circuit of the switch structure 92, whereupon the circuit to the electromagnetic relay 83 will be deenergized and that to the relay 90 energized whereupon the step-up relay 80 will effect a faster step-up movement of the contact finger 70. This condition is maintained until the illuminated bulb of the electric bulbs 17 becomes in alignment on a horizontal line with the illumination of the illuminated electric bulbs 15 and 16, at which time the operator breaks the circuit through the switch structure 92 and conditions the circuit to energize the electromagnetic coil 83. Upon alignment of the illuminated bulbs of the bulbs 15 and 17 the operator closes the push button switch 70 to effect illumination of that bulb of the bulbs 16 in line with the illuminated bulbs 15 and 17, to indicate a hit by a bomb.

Thus, it will be apparent that the skill employed in the operation of this game is the player's concentration on maintaining the illuminated light bulbs of the electric bulbs 15, 16 and 17 in registration on the same horizontal line.

I have not shown or described in detail the construction of the various instrumentalities employed in the circuit which accomplish the foregoing purpose, but have shown these parts merely schematically. It is understood that any standard equipment may be employed in the circuit and that the circuit illustrated to accomplish the objects of the invention is a form of circuit illustrated for a clear understanding of the invention and its operation. If desired, a suitable score counter of any standard construction now in use in connection with bagatelle or other like games may be incorporated in the circuit to tally the number of times the operator has maintained the proper registration of the illuminated light bulbs on the same horizontal line.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. An amusement game in which there is a play board having parallel rows of illuminating elements associated therewith, comprising means for illuminating said elements, said means including an electric circuit having therein a motor-operated step-up switch controlling the successive illumination of the elements of one of said rows of elements, a push-button-controlled step-up switch for controlling successive illumination of the elements of another row of said elements, a step-up switch including a slow and fast operated step-up relay for controlling successive illumination of the elements of still another row of said elements, and a push-button-operated switch controlling alternate operation of said step-up relay.

2. An amusement game in which there is a play board having thereon illuminating elements arranged in groups, means for illuminating said elements, said means including an electric circuit for said elements having therein a motor-operated step-up switch controlling the successive illumination of the elements of one of said groups, a push button controlled step-up switch for controlling successive illumination of the elements of another group of said elements, a step-up switch including a slow and fast operated step-up relay for controlling successive illumination of the elements of the remaining group of said groups of elements, a push-button-operated switch controlling alternate operation of said step-up relay, and characters simulating different objects on said play board in registration with said illuminating elements.

3. An amusement game in which there is a play board having a plurality of illuminating elements associated therewith and arranged in groups, means for illuminating said elements, said means including an electric circiut for said elements and having therein a motor-operated step-up switch controlling the successive illumination of the elements of one group of said elements, a step-up switch including a slow and fast operated step-up relay for controlling successive illumination of the elements of the other group of said elements, a push-button-operated switch controlling alternate operation of said step-up relay, and characters simulating different objects on said play board in registration with and adapted to be illuminated by said illuminating elements.

WILLIAM H. BURDICK.

REFERENCES CITED

The following references are of record in the file of this patent:

UNITED STATES PATENTS

| Number | Name | Date |
| --- | --- | --- |
| 1,803,064 | Karnes | Apr. 28, 1931 |
| 1,976,082 | Meyer | Oct. 9, 1934 |
| 1,999,810 | Hershey | Apr. 30, 1935 |
| 2,019,126 | Fey | Oct. 29, 1935 |
| 2,118,037 | Fischer | May 24, 1938 |
| 2,266,932 | Williams | Dec. 23, 1941 |